US012337348B2

(12) United States Patent
Su et al.

(10) Patent No.: US 12,337,348 B2
(45) Date of Patent: Jun. 24, 2025

(54) ULTRASONIC TRANSDUCER

(71) Applicant: Unictron Technologies Corporation, Hsin-Chu (TW)

(72) Inventors: Yi-Ting Su, Hsinchu (TW); Lung Chen, Taipei (TW); Wei-Jen Wu, Hsinchu County (TW); Sheng-Yen Tseng, Taoyuan (TW); Ming-Chu Chang, Hsinchu County (TW)

(73) Assignee: Unictron Technologies Corporation, Hsin-Chu (TW)

( * ) Notice: Subject to any disclaimer, the term of this patent is extended or adjusted under 35 U.S.C. 154(b) by 821 days.

(21) Appl. No.: 17/585,584

(22) Filed: Jan. 27, 2022

(65) Prior Publication Data

US 2023/0166294 A1 Jun. 1, 2023

(30) Foreign Application Priority Data

Nov. 26, 2021 (TW) ................................ 110144205

(51) Int. Cl.
*B06B 1/06* (2006.01)

(52) U.S. Cl.
CPC ............ *B06B 1/0685* (2013.01); *B06B 1/067* (2013.01)

(58) Field of Classification Search
CPC .............................. B06B 1/0685; B06B 1/067
See application file for complete search history.

(56) References Cited

U.S. PATENT DOCUMENTS

| | | | | |
|---|---|---|---|---|
| 2003/0121331 A1* | 7/2003 | Mitsuoka | G10K 9/122 | 73/632 |
| 2006/0032286 A1* | 2/2006 | Magane | G01H 5/00 | 73/1.82 |
| 2010/0296692 A1* | 11/2010 | Reiche | H04R 31/00 | 381/423 |
| 2021/0046507 A1* | 2/2021 | Chen | H10N 30/88 | |
| 2022/0105542 A1* | 4/2022 | Taki | B06B 1/0655 | |

FOREIGN PATENT DOCUMENTS

| | | |
|---|---|---|
| CN | 103063243 A | 4/2013 |
| CN | 103111410 A | 5/2013 |
| TW | M606176 U | 1/2021 |

OTHER PUBLICATIONS

English Translation of TW M606176 (Year: 2019).*

* cited by examiner

*Primary Examiner* — Bryan P Gordon
(74) *Attorney, Agent, or Firm* — Winston Hsu

(57) ABSTRACT

An ultrasonic transducer includes a piezoceramic element with a first surface and a second surface opposite to each other through the piezoceramic element and a lateral surface connecting the first surface and the second surface, an acoustic matching layer with a third surface and a fourth surface opposite to each other through the acoustic matching layer and the third surface connecting with the second surface of the piezoceramic element, a first damping element with a fifth surface and a sixth surface opposite to each other through the first damping element and the sixth surface connecting with the first surface of the piezoceramic element, and a second damping element encapsulating the first damping element and the lateral surface of the piezoceramic element.

19 Claims, 5 Drawing Sheets

ULTRASONIC TRANSDUCER

BACKGROUND OF THE INVENTION

1. Field of the Invention

The present invention relates generally to an ultrasonic transducer, and more specifically, to an ultrasonic transducer with dual damping elements.

2. DESCRIPTION OF THE PRIOR ART

Current ultrasonic transducer may be used in short-range object detection. Through calculation of the time difference between emitting waves and reflected waves from objects, the distance between the ultrasonic transducer and detected object may be obtained. In the field of ultrasonic detection, the types and properties of objects to be detected is not quite restrictive. Solid, liquid or particle with various surface colors, transparencies and hardness may all be detected by using the ultrasonic transducer. Therefore, the ultrasonic transducer nowadays is widely used in the fields like parking sensors, level sensors, multiple sheet detection and flow meter.

The main component of an ultrasonic transducer is piezoceramic element, for example, the ceramic element made of lead zirconate titanate (PZT) material with two opposite surfaces coated with conductive layers to apply high-frequency alternating current signal in the operation, so that the piezoceramic element would generate high-frequency vibration. This high-frequency vibration is a kind of wave energy. It may be in a form of ultrasonic wave, i.e. ultrasonic vibration, if its wavelength falls within the range of ultrasound. However, in order to transmit the generated ultrasonic waves from the piezoceramics into air, the acoustic impedances of piezoceramics and air should be matched.

The formula to calculate the acoustic impedance (Z) is $Z=\rho\cdot c$ $\rho$=material density, c=ultrasonic velocity). The acoustic impedance of piezoceramic is about 30-35 MRayl (106 $kg/m^2\cdot S$), while the acoustic impedance of air is about 430 Rayl ($kg/m^2\cdot S$). Since there is a huge gap between the acoustic impedances of piezoceramic and air, the ultrasonic energy generated by the piezoceramic can't be transmitted to air. Therefore, the acoustic matching layer becomes a critical component in ultrasonic transducers. The acoustic matching layer is designed to be set between the piezoceramic and air to match the acoustic impedances thereof, so that the ultrasonic wave may be effectively transmitted to air. The ideal value of acoustic impedance for the acoustic matching layer used in air transducer is (35M.430) 0.5 Rayl, i.e. about 0.12 MRayl. However, it is difficult to find a durable material with acoustic impedance lower than 1 MRayl in nature. Therefore, commonly-used material of the acoustic matching layer in transducer industry is composite material with mixed polymer resin and hollow glass particles, to achieve lower acoustic impedance, and at the same time, provide better weatherability and reliability.

Since the ultrasonic transducer requires high frequency vibration to generate waves, it is an essential topic for those skilled in the art to reduce the ringing of ultrasonic transducer and to quickly restore the ultrasonic transducer back to its static state from vibration. Currently, damping elements are used in the industry to be set around the ultrasonic transducer for providing damping. However, it's damping effect and reliability still need to be further improved.

The disclosure of the above background art is only for assisting the understanding of the concept and technical solution of the present application, and does not necessarily belong to the prior art relevant to the present application. The above background art shall not be used to evaluate the novelty and inventiveness of the present application without any explicit evidence showing that the above content has been disclosed before the filing date of the present application.

SUMMARY OF THE INVENTION

The summary of present invention is provided in following paragraphs to assist readers having a better understanding of the subject matter of present invention. The summary is presented to be not exhaustive and/or exclusive to the features and advantages of the present invention, and doesn't intend to list all crucible or essential elements or to limit the scope of present invention. With the purpose just to provide certain concepts relied therein to be described through embodiments in a simplified form, detailed features and advantages of the invention will become apparent in the following description, from the drawings, and from the claims.

The objective of the present invention is to provide a novel ultrasonic transducer with dual damping elements to improve the damping effect and reliability of current ultrasonic transducers.

One aspect of the present invention is to provide an ultrasonic transducer, including a piezoceramic element with a first surface and a second surface opposite to each other through the piezoceramic element and a lateral surface connecting with the first surface and the second surface, an acoustic matching layer with a third surface and a fourth surface opposite to each other through the acoustic matching layer, and the third surface connects with the second surface of the piezoceramic element, a first damping element with a fifth surface and a sixth surface opposite to each other through the first damping element, and the sixth surface connects with the first surface of the piezoceramic element, and a second damping element encapsulating the first damping element and the lateral surface of the piezoceramic element.

Another aspect of the present invention is to provide an ultrasonic transducer, including a piezoceramic element with a first surface and a second surface opposite to each other through the piezoceramic element and a lateral surface connecting with the first surface and the second surface, a carrier with a third surface and a fourth surface opposite to each other through the carrier, and the third surface connects with the second surface of the piezoceramic element, a first damping element with a fifth surface and a sixth surface opposite to each other through the first damping element, and the sixth surface connects with the first surface of the piezoceramic element, and a second damping element encapsulating the first damping element and the lateral surface of the piezoceramic element.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute a part of this specification. The drawings illustrate some of the embodiments and, together with the description, serve to explain their principles. In the drawings.

Figure 1:
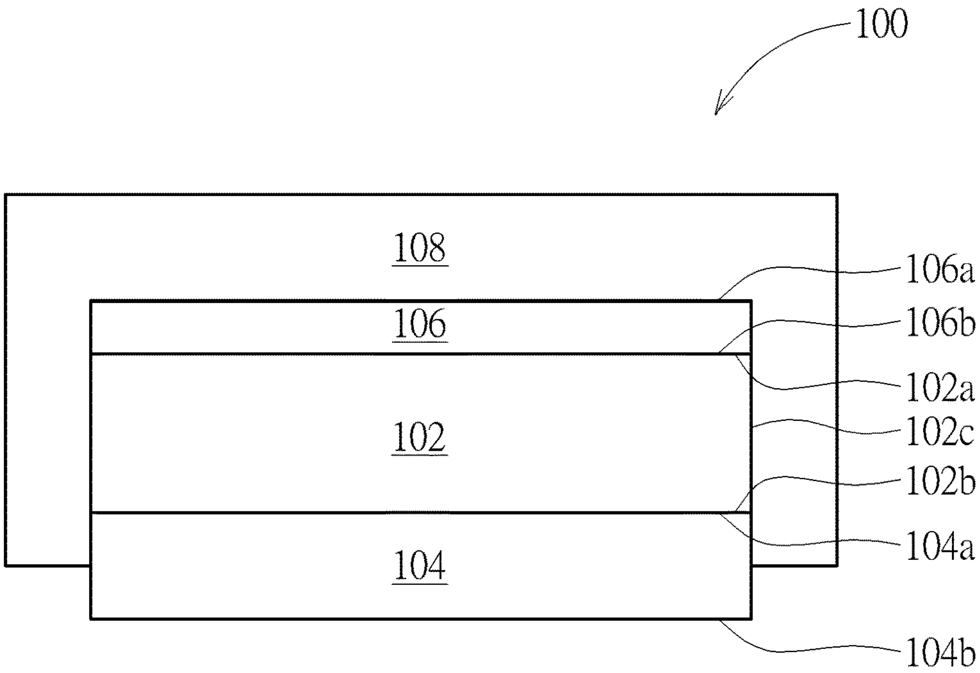
FIG. 1 is a cross-sectional view illustrating one mode of the ultrasonic transducer in accordance with one embodiment of the present invention.

It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

In following detailed description of the present invention, reference is made to the accompanying drawings which form a part hereof and is shown by way of illustration and specific embodiments in which the invention may be practiced. These embodiments are described in sufficient details to enable those skilled in the art to practice the invention. Dimensions and proportions of certain parts of the drawings may have been shown exaggerated or reduced in size, for the sake of clarity and convenience in the drawings. Other embodiments may be utilized and structural, logical, and electrical changes may be made without departing from the scope of the present invention. The following detailed description, therefore, is not to be taken in a limiting sense, and the scope of the present invention is instead defined by the appended claims.

First, please refer to FIG. 1, which is a cross-sectional view illustrating one mode of the ultrasonic transducer 100 in accordance with one embodiment of the present invention. In this embodiment, the ultrasonic transducer 100 includes a piezoelectric element 102 with a first surface 102*a*, a second surface 102*b* opposite to the first surface 102*a* across the piezoelectric element 102 and a lateral surface 102*c* connecting the first surface 102*a* and the second surface 102*b*. The piezoceramic element 102 may include solid piezoceramic material in a shape of square, polygon or circle, or ringlike piezoceramic material, or multilayer piezoceramic material, or a piezoceramic material with grooves. These piezoceramic materials may include leaded piezoceramic material like $Pb(ZrTi)O_3$, $PbTiO_3$, or lead-free piezoceramic material like $BaTiO_3$, $(NaK)NbO_3$, with an acoustic impedance about 30-35 MRayl much greater than the acoustic impedance of air (about 430 Rayl), thus an acoustic matching layer is required to match the acoustic impedances in these two mediums. The conductive layer on the piezoceramic element 102 may be connected with conductive wires (not shown) to electrically connect external high-frequency alternating current signal to the piezoceramic element 102 and generate high-frequency vibration in order to emit ultrasonic waves. An acoustic matching layer 104 is provided with a third surface 104*a* and a fourth surface 104*b* opposite to the third surface 104*a* across the acoustic matching layer 104, wherein the third surface 104*a* is attached on and directly contacts the second surface 102*b* of the piezoceramic element 102. In the embodiment of present invention, the thickness of the acoustic matching layer 104 should be equal to or close to ¼ wavelength of the ultrasonic wave emitted by the piezoceramic element 102 in the acoustic matching layer 104 in an operating frequency of the ultrasonic transducer 100, to achieve optimal ultrasonic transmission.

The material of acoustic matching layer 104 may be organic polymer materials or composite materials made of organic polymer materials mixing with hollow particles or solid particles. The organic polymer material includes epoxy, vinyl ester resin, acrylic resin, polyurethane or UV resin. The hollow particles or solid particles may be hollow glass particles or solid glass particles, as a filler to be uniformly distributed in the organic polymer materials to adjust total density of the acoustic matching layer 104. The density of hollow glass particles is between 0.1 $g/cm^3$ to 0.6 $g/cm^3$. Since the acoustic impedance is proportional to the density of material, the lower the density of the acoustic matching layer 104 is, the lower the acoustic impedance is obtained, so that better acoustic matching may be achieved. The acoustic matching layer 104 may be modulated with different densities by adding the glass particles with different percentage by volume into the organic polymer materials and undergo mixing, degasing and curing treatment.

Refer still to FIG. 1. In addition to the aforementioned components, the ultrasonic transducer 100 of the present invention may further include damping structure. As shown in FIG. 1, a first damping element 106 is provided with a fifth surface 106*a* and a six surface 106*b* opposite to each other across the first damping element 106, wherein the sixth surface 106*b* is attached on the first surface 102*a* of the piezoceramic element 102 and directly connected therewith. In this way, the first damping element 106 may effectively buffer to lower the ringing of the ultrasonic transducer under high-frequency vibration in the operation of piezoceramic element 102. In addition, the ultrasonic transducer 100 may be further provided with a second damping element 108 encapsulating the first damping element 106 to provide improved damping effect. As shown in FIG. 1, the second damping element 108 may encapsulate entire first damping element 106 and the lateral surface 102*c* of the piezoceramic element 102, and may further extend to encapsulate parts of the lateral surface of the acoustic matching layer 104. In the embodiment, the damping coefficients of first damping element 106 and second damping element 108 are different, and the hardness of first damping element 106 and second damping element 108 may also be different, for example the hardness of first damping element 106 is smaller than or equal to the hardness of second damping element 108, so that these two damping elements with different types and configurations may further effectively damping the piezoceramic element 102 in high-frequency vibration and reset it into static state. This design facilitates the operation of ultrasonic transducer and provides better damping effect. The material of first damping element 106 may be fibrous elastomer, including specifically silicone, rubber, ethylene vinyl acetate (EVA), styrene elastomer, polyester elastomer, olefin elastomer, thermoplastic vulcanized rubber (TPV), thermoplastic polyurethane (TPU), epoxy, wood cork, polyester staple, wool felt, glass fiber or foam. The second damping element 108 includes organic polymer materials or a composite material made of the organic polymer materials mixing with metal or non-metal particles, and the organic polymer material comprises polyurethane, silicone, epoxy, vinyl ester resin, UV resin or cyanate ester resin.

Figure 2:
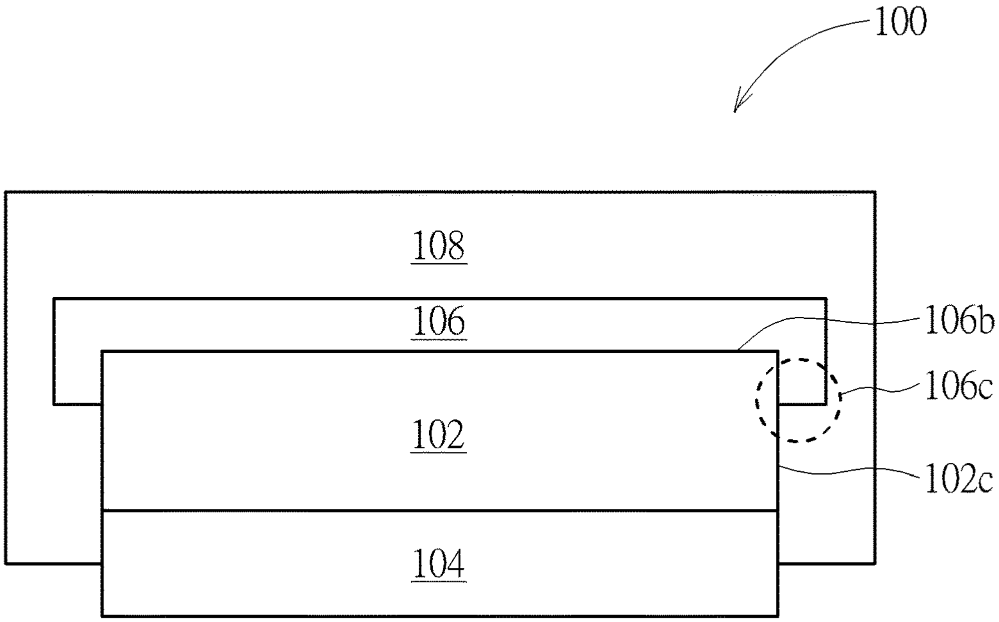
FIG. 2 is a cross-sectional view illustrating another mode of the ultrasonic transducer in accordance with one embodiment of the present invention.

Next, please refer to FIG. 2, which is a cross-sectional view illustrating another mode of the ultrasonic transducer in accordance with one embodiment of the present invention. The ultrasonic transducers in the embodiments of FIG. 1 and FIG. 2 are essentially the same, with the difference lies in that the flange 106*c* of sixth surface 106*b* of the first damping element 106 in the embodiment of FIG. 2 extends to connect parts of the lateral surface 102*c* of the piezoceramic element 102. This design ensures the contact between the piezoceramic element 102 and the first damping element 106, thereby improving the damping effect.

Figure 3:
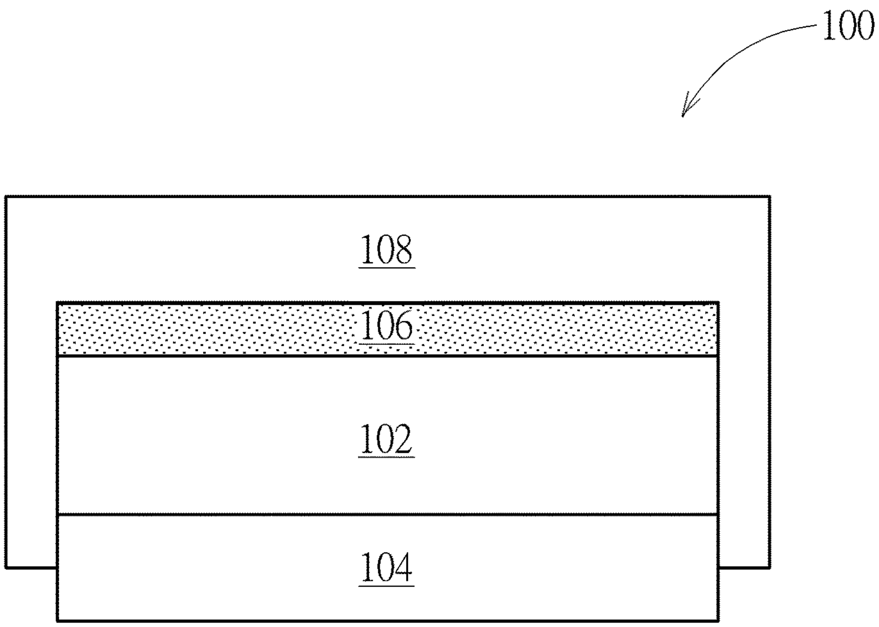
FIG. 3 is a cross-sectional view illustrating still another mode of the ultrasonic transducer in accordance with one embodiment of the present invention.

Next, please refer to FIG. 3, which is a cross-sectional view illustrating another mode of the ultrasonic transducer in accordance with one embodiment of the present invention. The ultrasonic transducers in the embodiments of FIG. 3 and FIG. 1 are essentially the same, with the difference lies in that the material of first damping element 106 in the embodiment of FIG. 3 may use porous material, which may include specifically organic polymer materials or a composite material made of the organic polymer materials mixing with hollow particles. The organic polymer material includes epoxy, vinyl ester resin, polyurethane, acrylic resin or cyanate ester resin. Pores formed in the porous material may improve the damping effect.

Figure 4:
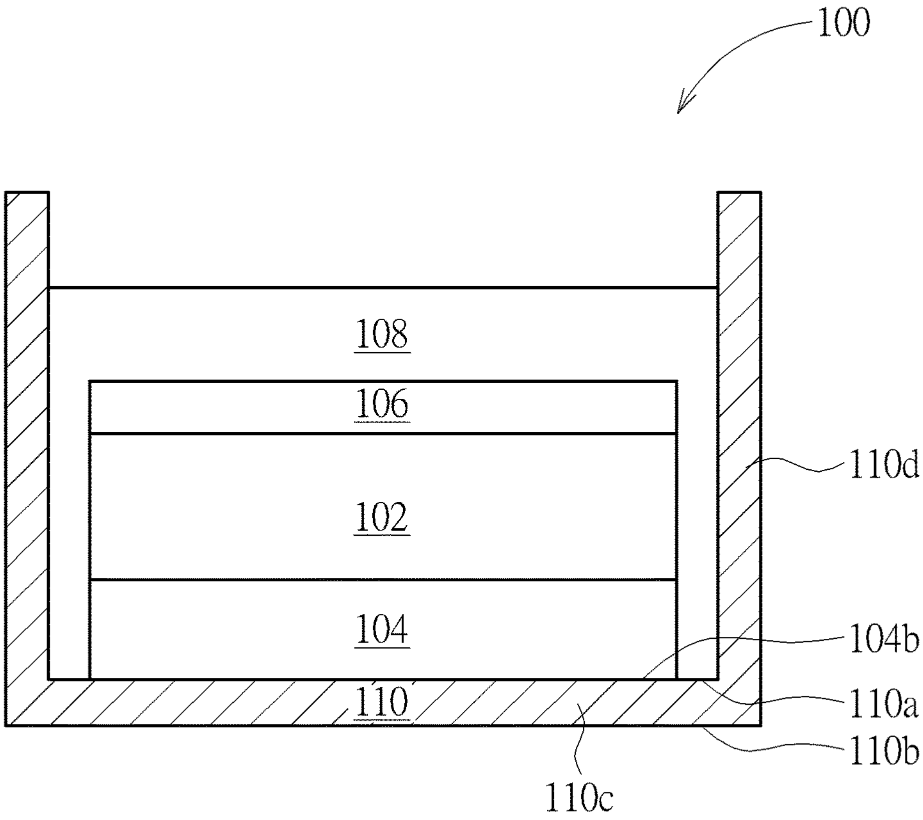
FIG. 4 is a cross-sectional view illustrating still another mode of the ultrasonic transducer in accordance with one embodiment of the present invention.

Next, please refer to FIG. 4, which is a cross-sectional view illustrating another mode of the ultrasonic transducer in accordance with one embodiment of the present invention. The ultrasonic transducer 100 of the present invention may be set in a barrel-shaped carrier 110. The barrel-shaped carrier 110 is made of a bottom 110*c* and a body 110*d*, and the barrel-shaped carrier 110 is provided with a seventh surface 110*a* and an eighth surface 110*b* opposite to the seventh surface 110*a* across the bottom 110*c*, wherein the piezoceramic element 102, the acoustic matching layer 104, the first damping element 106 and the second damping element 108 are set in the barrel-shaped carrier 110, and the fourth surface 104*b* of the acoustic matching layer 104 is attached on and directly contacts the seventh surface 110*a* of the bottom 110*c* of the barrel-shaped carrier 110, while the body 110*d* of the barrel-shaped carrier 110 surrounds and connects with the second damping element 108. This design is more suitable for the ultrasonic transducer to be used in external harsh environment, to effectively protect the acoustic matching layers from damage. The material of the barrel-shaped carrier 110 may be selected from metal materials of following group or the combination thereof: aluminum (Al), titanium (Ti), copper (Cu), stainless steel, or is selected from f non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

Figure 5:
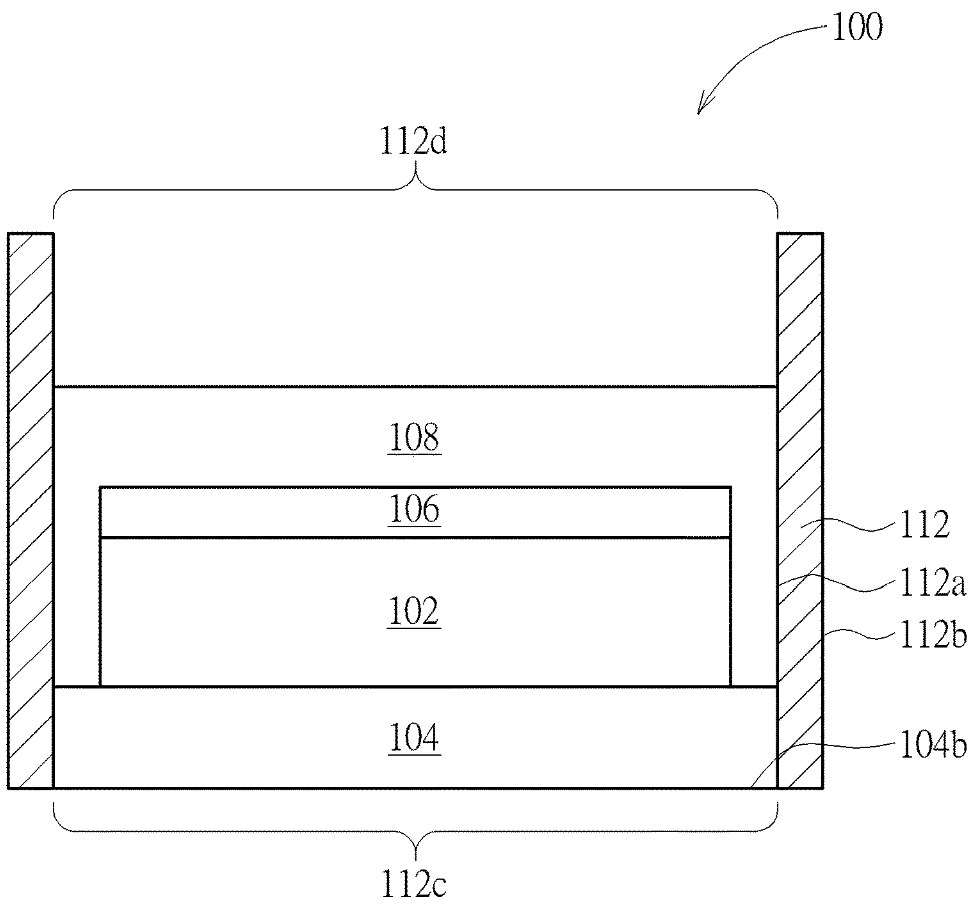
FIG. 5 is a cross-sectional view illustrating still another mode of the ultrasonic transducer in accordance with one embodiment of the present invention.

Next, please refer to FIG. 5, which is a cross-sectional view illustrating another mode of the ultrasonic transducer in accordance with one embodiment of the present invention. In previous embodiment of FIG. 4, the piezoceramic element 102 and the acoustic matching layer 104 are set on a barrel-shaped carrier. However, in the embodiment of present invention, the piezoceramic element 102 and the acoustic matching layer 104 are set on a tubular carrier 112. As shown in the figure, the ultrasonic transducer 100 includes a tubular carrier 112 with an inner surface 112*a* and an outer surface 112*b* opposite to the inner surface 112*a* across the tubular carrier 112 and a first opening 112*c* and a second opening 112*d* opposite to the first opening 112*c* across the tubular carrier 112, wherein the inner surface 112*a* of the tubular carrier 112 also surrounds and connects with the acoustic matching layer 104, so that the acoustic matching layer 104 and the piezoceramic element 102 are fixed on the tubular carrier 112, and the fourth surface 104*b* of the acoustic matching layer 104 is exposed from the first opening 112*c* of the tubular carrier 112. The material of the tubular carrier 112 may be selected from metal materials of following group or the combination thereof: aluminum (Al), titanium (Ti), copper (Cu), stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

In some embodiments, the ultrasonic transducer of present invention may not require acoustic matching layer. Instead, the ultrasound may be generated by attaching the piezoceramic element directly on adjacent carrier structure to achieve bending vibration mode and/or thickness vibration mode. Please refer to FIG. 6, which is a cross-sectional view illustrating another mode of the ultrasonic transducer in accordance with one embodiment of the present invention. In this embodiment, the ultrasonic transducer 100 includes a piezoelectric element 102 with a first surface 102*a*, a second surface 102*b* opposite to the first surface 102*a* across the piezoelectric element 102 and a lateral surface 102*c* connecting the first surface 102*a* and the second surface 102*b*. The piezoceramic element 102 may include solid piezoceramic material in a shape of square, polygon or circle, or ringlike piezoceramic material, or multilayer piezoceramic material, or a piezoceramic material with grooves. These piezoceramic materials may include leaded piezoceramic material like Pb $(ZrTi)O_3$, $PbTiO_3$, or lead-free piezoceramic material like $BaTiO_3$, $(NaK)NbO_3$. The piezoceramic element 102 may be attached directly on the carrier 114 to achieve bending vibration mode and/or thickness vibration mode. The conductive layer on the piezoceramic element 102 may be connected with conductive wires (not shown) to electrically connect external high-frequency alternating current signal to the piezoceramic element 102 and generate high-frequency vibration together with the carrier, in order to emit ultrasonic waves.

Figure 6:
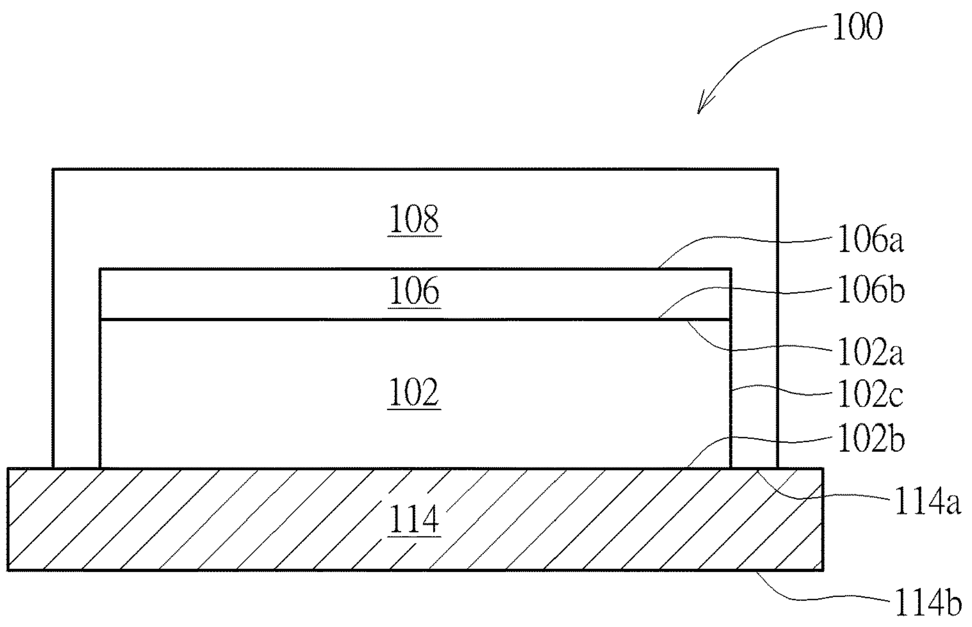
FIG. 6 is a cross-sectional view illustrating still another mode of the ultrasonic transducer in accordance with one embodiment of the present invention.

Refer still to FIG. 6, a first damping element 106 is provided with a fifth surface 106*a* and a six surface 106*b* opposite to each other across the first damping element 106, wherein the sixth surface 106*b* is attached on the first surface 102*a* of the piezoceramic element 102 and directly connected therewith. In this way, the first damping element 106 may effectively buffer to lower the ringing of the ultrasonic transducer under high-frequency vibration in the operation of piezoceramic element 102. In addition, the ultrasonic transducer 100 may be further provided with a second damping element 108 encapsulating the first damping element 106 to provide improved damping effect. As shown in FIG. 6, the second damping element 108 may encapsulate entire first damping element 106 and the lateral surface 102*c* of the piezoceramic element 102. The damping coefficients of first damping element 106 and second damping element 108 may be different, and the hardness of first damping element 106 and second damping element 108 may also be different. For example, the hardness of first damping element 106 is smaller than or equal to the hardness of second damping element 108, so that these two damping elements with different types and configurations may further effectively damping the piezoceramic element 102 in high-frequency vibration and reset it into static state. This design facilitates the operation of ultrasonic transducer and provides better damping effect. The material of first damping element 106 may be fibrous elastomer, including specifically silicone, rubber, ethylene vinyl acetate (EVA), styrene elastomer, polyester elastomer, olefin elastomer, thermoplastic vulcanized rubber (TPV), thermoplastic polyurethane (TPU), epoxy, wood cork, polyester staple, wool felt, glass fiber or foam. The second damping element 108 includes organic polymer materials or a composite material made of the organic polymer materials mixing with metal or non-metal particles, and the organic polymer material comprises polyurethane, silicone, epoxy, vinyl ester resin, UV resin or cyanate ester resin.

In this embodiment, the piezoceramic element 102 is not attached on the acoustic matching layer 104 as the one of aforementioned embodiment, instead, it is attached on a carrier 114. As shown in FIG. 6, the carrier 114 is provided with a third surface 114*a* and a fourth surface 114*b* opposite to each other across the carrier 114, and the third surface 114*a* connects the second surface 102*b* of the piezoceramic element 102. The second damping element 108 may also extend to connect with the third surface 114*a* of the carrier 114. The components like piezoceramic element 102, first damping element 106 and second damping element 108 of entire ultrasonic transducer 100 are fixed on a flat carrier 114 without setting the acoustic matching layer. The material of carrier 114 may be selected from metal materials of following group or the combination thereof: aluminum (Al), titanium (Ti), copper (Cu), stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

Figure 7:
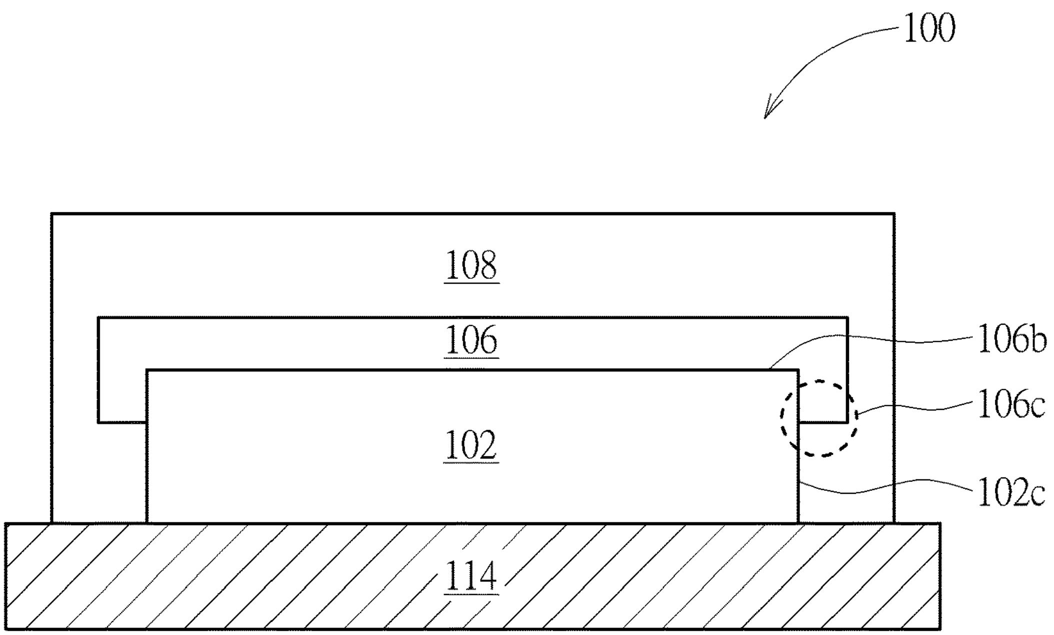
FIG. 7 is a cross-sectional view illustrating still another mode of the ultrasonic transducer in accordance with one embodiment of the present invention.

Next, please refer to FIG. 7, which is a cross-sectional view illustrating another mode of the ultrasonic transducer in accordance with one embodiment of the present invention. The ultrasonic transducers in the embodiments of FIG. 7 and FIG. 6 are essentially the same, with the difference lies in that the flange 106*c* of sixth surface 106*b* of the first damping element 106 in the embodiment of FIG. 7 extends to connect parts of the lateral surface 102*c* of the piezoceramic element 102. This design ensures the contact between the piezoceramic element 102 and the first damping element 106, thereby improving the damping effect.

Figure 8:
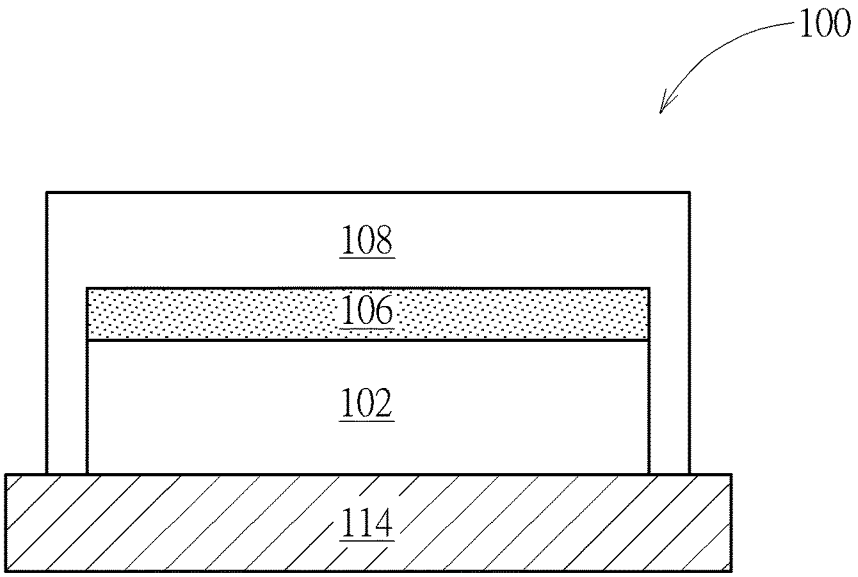
FIG. 8 is a cross-sectional view illustrating still another mode of the ultrasonic transducer in accordance with one embodiment of the present invention.

Next, please refer to FIG. 8, which is a cross-sectional view illustrating another mode of the ultrasonic transducer in accordance with one embodiment of the present invention. The ultrasonic transducers in the embodiments of FIG. 8 and FIG. 6 are essentially the same, with the difference lies in that the material of first damping element 106 in the embodiment of FIG. 8 may use porous material, which may include specifically organic polymer materials or a composite material made of the organic polymer materials mixing with hollow particles. The organic polymer material includes epoxy, vinyl ester resin, polyurethane, acrylic resin or cyanate ester resin. Pores formed in the porous material may improve the damping effect.

Figure 9:
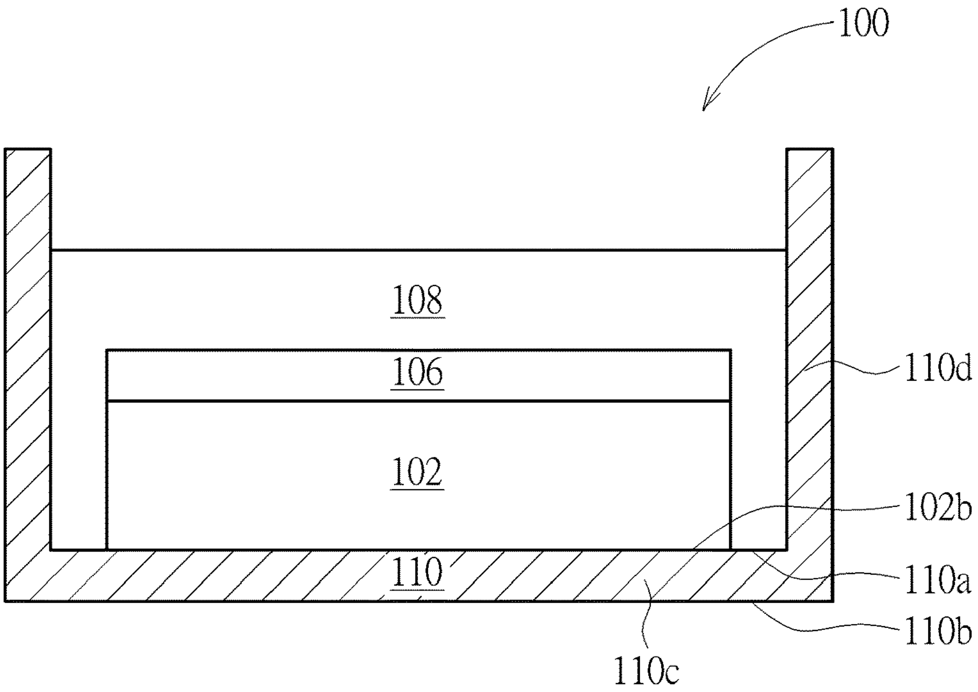
FIG. 9 is a cross-sectional view illustrating still another mode of the ultrasonic transducer in accordance with one embodiment of the present invention.

Next, please refer to FIG. 9, which is a cross-sectional view illustrating another mode of the ultrasonic transducer in accordance with one embodiment of the present invention. The ultrasonic transducer 100 of the present invention may be set in a barrel-shaped carrier 110. The barrel-shaped carrier 110 is made of a bottom 110*c* and a body 110*d*, and the barrel-shaped carrier 110 is provided with a seventh surface 110*a* and an eighth surface 110*b* opposite to the seventh surface 110*a* across the bottom 110*c*, wherein the piezoceramic element 102, the first damping element 106 and the second damping element 108 are set in the barrel-shaped carrier 110, and the second surface 102*b* of the piezoceramic element 102 is attached on and directly contacts the seventh surface 110*a* of the bottom 110*c* of the barrel-shaped carrier 110, while the body 110*d* of the barrel-shaped carrier 110 surrounds and connects with the second damping element 108. This design is more suitable for the ultrasonic transducer to be used in external harsh environment. The material of the barrel-shaped carrier 110 may be selected from metal materials of following group or the combination thereof: aluminum (Al), titanium (Ti), copper (Cu), stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

Figure 10:
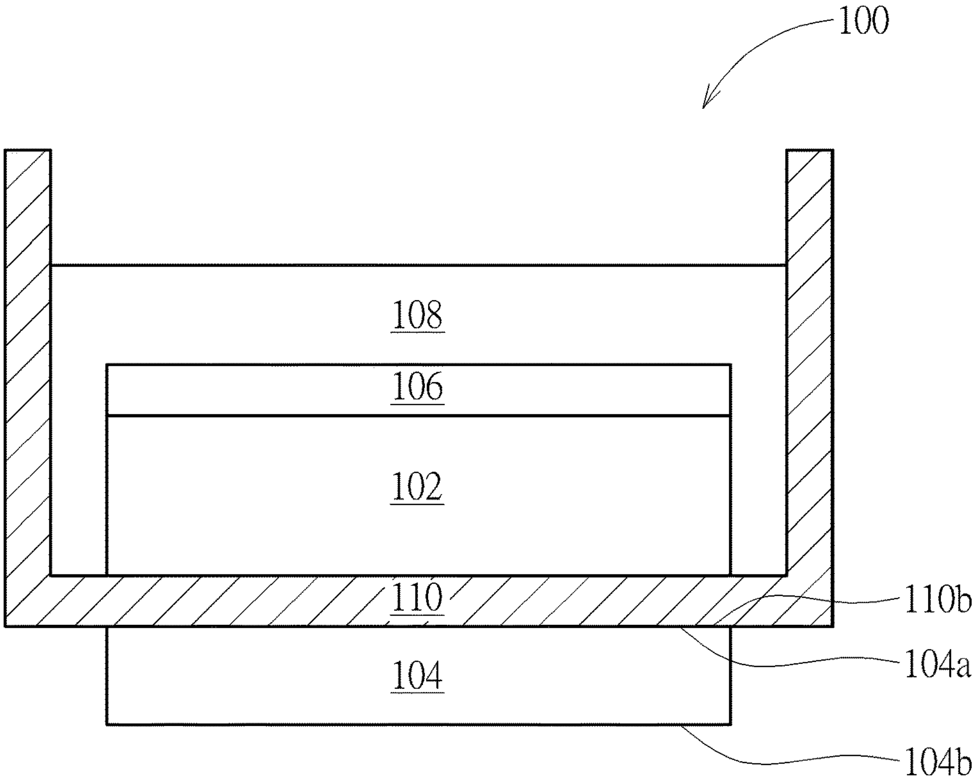
FIG. 10 is a cross-sectional view illustrating still another mode of the ultrasonic transducer in accordance with one embodiment of the present invention.

Next, please refer to FIG. 10, which is a cross-sectional view illustrating another mode of the ultrasonic transducer in accordance with one embodiment of the present invention. The ultrasonic transducer 100 in the embodiments of FIG. 10 and FIG. 9 are essentially the same, with the difference lies in that the ultrasonic transducers 100 in the embodiment of FIG. 10 further includes an acoustic matching layer 104 set outside the barrel-shaped carrier 110. The acoustic matching layer 104 is provided with a third surface 104*a* and a fourth surface 104*b* opposite to each other across the acoustic matching layer 104, wherein the third surface 104*a* is attached on and directly contacts the eighth surface 110*b* of the barrel-shaped carrier 110. The material of acoustic matching layer 104 may be organic polymer materials or composite materials made of organic polymer materials mixing with hollow particles or solid particles. The organic polymer material includes epoxy, vinyl v ester resin, acrylic resin, polyurethane or UV resin. The hollow particles or solid particles may be hollow glass particles or solid glass particles, as a filler to be uniformly distributed in the organic polymer materials to adjust total density of the acoustic matching layer 104. The density of hollow glass particles is between 0.1 g/cm$^3$ to 0.6 g/cm$^3$. Since the acoustic impedance is proportional to the density of material, the lower the density of the acoustic matching layer 104 is, the lower the acoustic impedance is obtained, so that better acoustic matching may be achieved. The acoustic matching layer 104 may be modulated with different densities by adding the glass particles with different percentage by volume into the organic polymer materials and undergo mixing, degasing and curing treatment. This embodiment is suitable for the case that the barrel-shaped carrier 110 is required to provide protection and the acoustic matching layer 104 is used to provide acoustic matching.

According to the modes of the ultrasonic transducers provided in the aforementioned embodiments, it may be clearly understood that the design of dual damping elements with different parameters may cooperate to further improve damping effect, and is compatible to both the applications of barrel-shaped carrier and flat carrier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ultrasonic transducer, comprising:

a piezoceramic element with a first surface and a second surface opposite to each other through the piezoceramic element and a lateral surface connecting with the first surface and the second surface;

an acoustic matching layer with a third surface and a fourth surface opposite to each other through the acoustic matching layer, and the third surface connects with the second surface of the piezoceramic element;

a first damping element with a fifth surface and a sixth surface opposite to each other through the first damping element, and the sixth surface connects with the first surface of the piezoceramic element; and a second damping element encapsulating the first damping element and the lateral surface of the piezoceramic element, wherein the second damping element directly contacts an entire lateral surface of the first damping element and the entire lateral surface of the piezoceramic element.

2. The ultrasonic transducer of claim 1, wherein a flange of the sixth surface of the first damping element extends to connect with the lateral surface of the piezoceramic element.

3. The ultrasonic transducer of claim 1, wherein the second damping element further encapsulates a lateral surface of the acoustic matching layer.

4. The ultrasonic transducer of claim 1, wherein the first damping element comprises elastic polymer or fibrous elastomer, comprising silicone, styrene elastomer, polyester elastomer, olefin elastomer, thermoplastic vulcanized rubber, polyurethane, epoxy, wood cork, polyester staple, wool felt, glass fiber or foam.

5. The ultrasonic transducer of claim 1, wherein the first damping element comprises organic polymer materials or comprises a composite material made of the organic polymer materials mixing with hollow particles, and the organic polymer material comprises epoxy, vinyl ester resin, polyurethane, acrylic resin or cyanate ester resin.

6. The ultrasonic transducer of claim 1, wherein the second damping element comprises organic polymer materials or comprises a composite material made of the organic polymer materials mixing with metal or non-metal particles, and the organic polymer material comprises polyurethane, silicone, epoxy, vinyl ester resin, UV resin or cyanate ester resin.

7. The ultrasonic transducer of claim 1, wherein the piezoceramic element comprises solid piezoceramic material in a shape of square, polygon or circle, or multilayer ceramic piezoceramic material, or a piezoceramic material with grooves.

8. The ultrasonic transducer of claim 1, further comprises a barrel-shaped carrier with a bottom and a body, and the barrel-shaped carrier is provided with a seventh surface and an eighth surface opposite to each other through the barrel-shaped carrier, wherein the piezoceramic element, the acoustic matching layer, the first damping element and the second damping element are set in the barrel-shaped carrier, and the seventh surface of the bottom of the barrel-shaped carrier connects with the fourth surface of the acoustic matching layer.

9. The ultrasonic transducer of claim 1, further comprising a tubular carrier with an inner surface and outer surface opposite to each other and a first opening and a second opening opposite to each other through the tubular carrier, wherein the inner surface of the tubular carrier surrounds and connects with the second damping element, and the fourth surface of the acoustic matching layer is exposed from the first opening of the tubular carrier.

10. An ultrasonic transducer, comprising:

a piezoceramic element with a first surface and a second surface opposite to each other through the piezoceramic element and a lateral surface connecting with the first surface and the second surface;

a carrier with a third surface and a fourth surface opposite to each other through the carrier, and the third surface connects with the second surface of the piezoceramic element;

a first damping element with a fifth surface and a sixth surface opposite to each other through the first damping element, and the sixth surface connects with the first surface of the piezoceramic element; and a second damping element encapsulating the first damping element and the lateral surface of the piezoceramic element, wherein the second damping element directly contacts an entire lateral surface of the first damping element and the entire lateral surface of the piezoceramic element.

11. The ultrasonic transducer of claim 10, wherein a flange of the sixth surface of the first damping element extends to connect with the lateral surface of the piezoceramic element.

12. The ultrasonic transducer of claim 11, wherein the second damping element further encapsulates a lateral surface of the carrier.

13. The ultrasonic transducer of claim 10, wherein the first damping element comprises elastic polymer or fibrous elastomer, comprising silicone, styrene elastomer, polyester elastomer, olefin elastomer, thermoplastic vulcanized rubber, polyurethane, epoxy, cork, polyester staple, wool felt, glass fiber or foam.

14. The ultrasonic transducer of claim 10, wherein the first damping element comprises organic polymer materials or comprises a composite material made of the organic polymer materials mixing with hollow particles, and the organic polymer material comprises epoxy, vinyl ester resin, polyurethane, acrylic resin or cyanate ester resin.

15. The ultrasonic transducer of claim 10, wherein the second damping element comprises organic polymer materials or comprises a composite material made of the organic polymer materials mixing with metal or non-metal particles, and the organic polymer material comprises polyurethane, silicone, epoxy, vinyl ester resin, UV resin or cyanate ester resin.

16. The ultrasonic transducer of claim 10, wherein the piezoceramic element comprises solid piezoceramic material in a shape of square, polygon or circle, or multilayer ceramic piezoceramic material, or a piezoceramic material with grooves.

17. The ultrasonic transducer of claim 10, further comprises a barrel-shaped carrier with a bottom and a body, and the barrel-shaped carrier is provided with a third surface and a fourth surface opposite to each other through the bottom, wherein the piezoceramic element, the first damping element and the second damping element are set in the barrel-shaped carrier, and the third surface of the bottom of the barrel-shaped carrier connects with the second surface of the piezoceramic element.

18. The ultrasonic transducer of claim 10, wherein a material of the barrel-shaped carrier is selected from metal materials of following group or the combination thereof: aluminum, titanium, copper, stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

19. The ultrasonic transducer of claim 10, further comprising an acoustic matching layer, and the acoustic matching layer connects with the fourth surface of the carrier.

* * * * *